INVENTORS
GEORGE W. JACKSON
JOHN F. PRIBONIC
BY
D. C. Staley
THEIR ATTORNEY

United States Patent Office 2,904,330
Patented Sept. 15, 1959

2,904,330

CONTROL FOR FLUID SUSPENSION SYSTEM

George W. Jackson and John F. Pribonic, Dayton, Ohio, assignors to General Motors Corporation, Detroit, Mich., a corporation of Delaware Application September 23, 1957, Serial No. 685,458

7 Claims. (Cl. 267—65)

This invention relates to a control mechanism for a fluid suspension system of a motor vehicle, and, particularly, to a mechanism having both damping and thermal compensating functions together with a safety means for protection during thermal compensating functioning to guard against free exhaust from air springs for which the mechanism controls inlet and exhaust of air used in maintaining a predetermined clearance height between sprung and unsprung masses of a vehicle.

An object of this invention is to provide a new and improved control mechanism for use in air suspension systems having air springs maintaining a predetermined clearance height between sprung and unsprung masses of a vehicle.

Another object of this invention is to provide a control mechanism operative to effect inlet and exhaust of air relative to an air spring between sprung and unsprung masses of a vehicle with the valve mechanism having a dashpot with both delay and thermal compensating functions such as to effect a centering force on the dashpot through spring means urging neutral positioning of the valve mechanism as to inlet and exhaust of air while a safety spacing means provided with the dashpot assures against complete collapse of the dashpot during thermal compensating functioning which would cause free exhaust of air from an air spring.

Another object of this invention is to provide a dashpot for damping and thermal compensating functions in a control valve mechanism operative to effect inlet and exhaust of air relative to an air spring between sprung and unsprung masses of a vehicle with the dashpot having a pair of diaphragms on opposite sides of a central partition having a restrictive passage connecting opposite damping chambers containing damping and thermal compensating fluid subject to continual force through dashpot spring means urging and pressing cylindrical buttons against the opposite diaphragms while a safety spacing means connected with dashpot spring means assures maintenance of a predetermined minimum separation of the spring urged buttons during thermal compensating functioning whereby temperature compensation is prevented from effecting positioning of the dashpot so as to result in free exhaust of air from the air spring by the controlled valve mechanism.

Another object of this invention is to provide a dashpot for damping and thermal compensating functions in a control valve mechanism operative to effect inlet and exhaust of air relative to an air spring between sprung and unsprung masses of a vehicle with the dashpot having a pair of diaphragms on opposite sides of a central partition having a restrictive passage connecting opposite damping chambers containing damping and thermal compensating fluid subject to continual force from opposite legs of a U-shaped dashpot spring means urging and pressing cylindrical buttons against the opposite diaphragms while a safety spacer bracket cooperates with ends of the spring legs to assure of a predetermined minimum separation of the U-shaped dashpot spring means and buttons during thermal compensating functioning whereby temperature compensation is prevented for effecting positioning of the dashpot so as to result in free exhaust of air from the sprung and unsprung masses of a vehicle with the valve mechanism having an inlet and exhaust actuating member pivotally attached at one end about a shaft that responds to changes of clearance height to other than a predetermined spacing between sprung and unsprung masses of a vehicle, the shaft and end of the member being resiliently connected through a torsion spring asserting self-centering force on the member for neutral positioning of the inlet and exhaust valve mechanism and also transmitting forces for effecting inlet and exhaust of air in response to changes of clearance height while a dashpot having damping and thermal compensating functions is connected resiliently to the other end of the member and exerts forces for damping and thermal compensating functions through opposite legs of a U-shaped spring means while a spacing means connected between ends of the legs of the U-shaped means assures maintenance of the spacing of the legs such that the U-shaped spring will not effect a collapse of the dashpot during thermal compensating functioning possibly resulting in pivoting of the member about the shaft to a position causing free exhaust of air from the air spring through the control valve mechanism.

Further objects and advantages of the present invention will be apparent from the following description, reference being had to the accompanying drawings, wherein a preferred embodiment of the invention is clearly shown.

Figure 1:
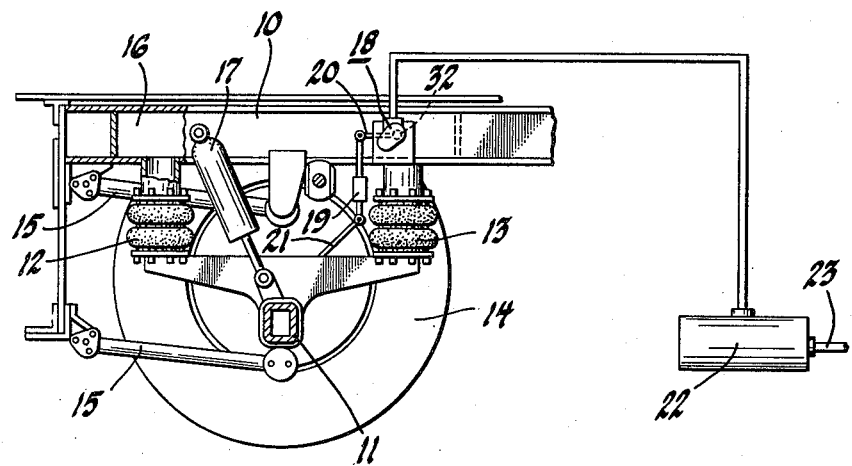
Figure 1 is an elevational view of a fluid suspension system in which features of this invention are incorporated.

Figure 1 illustrates an air suspension system for a vehicle incorporating control features of this invention for regulating supply and exhaust of air in the air suspension system. The vehicle includes a chassis or sprung mass 10 which is supported upon an axle or unsprung mass 11 by means of resilient fluid springs 12 and 13. The springs 12 and 13 are preferably formed as bellows structures adapted to contain air under pressure to support the sprung mass 10 at a predetermined clearance height or spacing between the axle 11 and chassis 10. A wheel 14 is carried by the axle 11 in a conventional manner. A pair of radius rods 15 are provided to maintain the axle 11 in position relative to the chassis 10.

An air chamber 16 is provided within the chassis 10 connecting air springs 12 and 13 so that an equivalent air pressure is maintained in both springs 12 and 13. A shock absorber 17 is journalled between the axle 11 and the chassis 10 in a conventional manner.

A control valve generally indicated by the numeral 18 regulates and governs supply and exhaust of air relative to the air springs 12 and 13. An adjustable link 19 is connected between an actuating arm 20 of the valve 18 and an upwardly extending arm 21 suitably attached to the axle 11. Since the control valve 18 is rigidly secured to the chassis 10, any change of clearance height to other than a predetermined spacing between the sprung and unsprung masses of the vehicle will result in movement of the actuating arm 20 of the valve through movement of link 19 as effected by the arm 21. This results in actuation of the valve 18 for opening the valve to allow air to flow from a reservoir 22 into the air springs, or to exhaust air from the air springs, depending upon whether the spacing between the axle and chassis has increased or decreased with change of clearance height due to a change of forces resulting from a change of load for example. The reservoir 22 is supplied with air under pressure from a compressor or pump source (not shown) through a pipe line or conduit 23.

Figure 2:
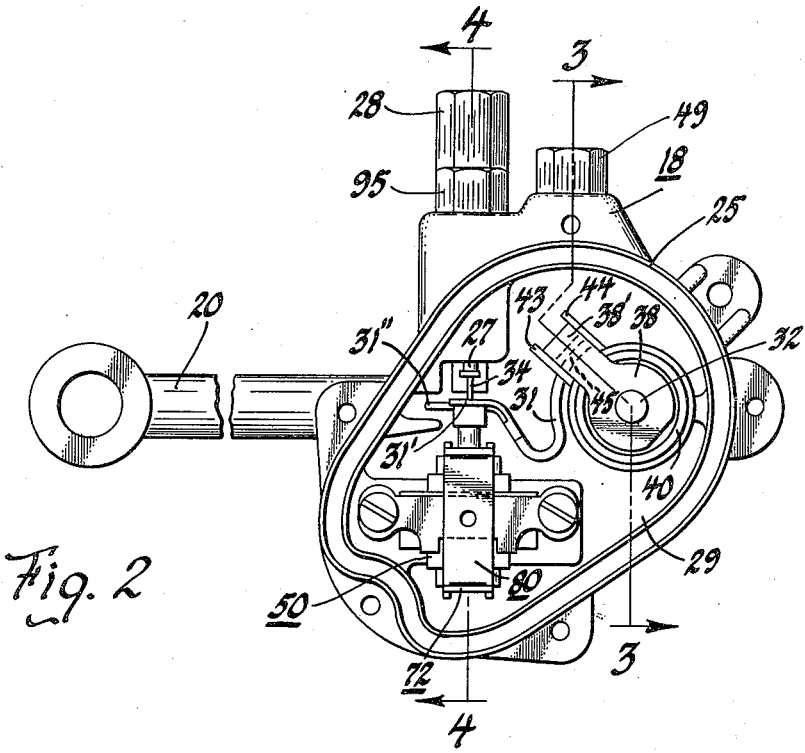
Figure 2 is a cross sectional view of a control valve mechanism used in the system of Fig. 1 and incorporating features of this invention.
Figure 3:
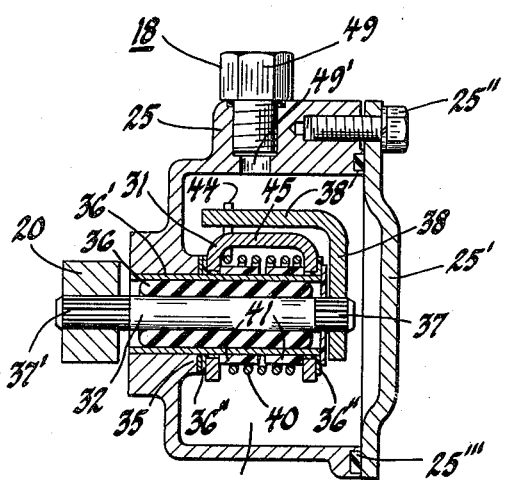
Figure 3 is a cross sectional view taken along line 3—3 of Fig. 2.
Figure 4:
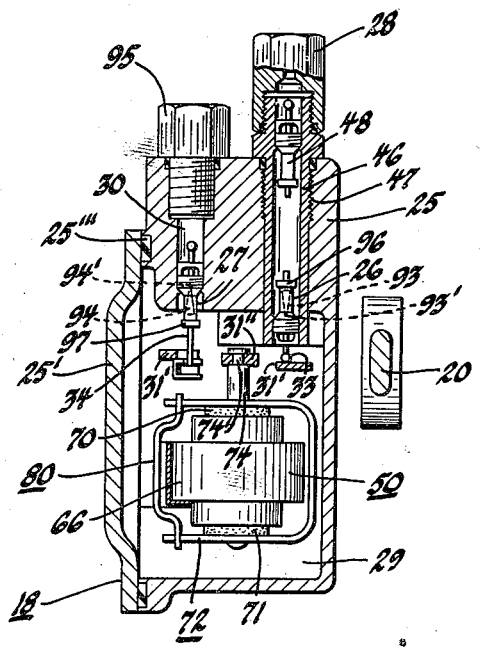
Figure 4 is a partial cross sectional view taken along line 4—4 of Fig. 2.

The control valve 18 as shown in further detail in Figs. 2, 3 and 4, includes a body 25 containing a pair of valves 26 and 27. The valves 26 and 27 are similar to conventional tire valves and are disposed in the body 25 in opposite relationship so that the valve 26 acts as an air inlet valve for allowing air to flow through an inlet pipe 28 into an interior cavity 29 of the body 25. The valve 27 provides for exhaust of air from chamber 29 through an exhaust opening 30 to which a fitting 95 for connection of a conduit is threaded in a conventional manner. It is to be understood that the interior cavity 29 of the body 25 is formed through cooperation of a cover 25' which is secured to the body 25 using head bolts 25'' in sealing relationship using an annular seal or gasket 25''' located between the body 25 and cover 25'. The cover 25' is located on one side of the valve body 25 such that the cover can be readily removed for obtaining easy access to parts inside the control valve 18. The removable cover 25' facilitates servicing the adjustment of parts of the valve 18 within the interior cavity 29.

Included with the parts inside the cavity 29 is a control arm or actuating plate 31 that is carried on an oscillating shaft 32, the control arm 31 being free to rotate on the shaft 32 and, conversely, the shaft being free to oscillate with reference to the control arm 31. A stem 33 of the valve 26 is engaged by the arm 31 during upward movement of the arm while a stem 34 of the valve 27 is engaged during downward movement of the arm 31 whereby the valves are operated upon opposite movement of the arm 31. The view in Fig. 2 illustrates how the control arm 31 is curved and bent to project in the interior cavity 29 to have ends 31' terminating adjacent the valves 26 and 27. The view in Fig. 4 illustrates how ends 31' are engaged with the valves 26 and 27, respectively. In addition, the control arm or actuating plate 31 is provided with an intermediate terminating end 31'' which is secured to a shaft for a damping and thermal compensating means to be described in further detail below. It can be seen that the oscillating shaft 32 is supported in the body or housing 25 in a boss 35 extending longitudinally into the cavity 29 toward the cover 25', a resilient means or rubber sleeve 36 being provided within a sleeve 36' relative to the boss 35 such that the shaft 32 is located concentrically within the sleeve 36 and compresses the resilient material of the sleeve 36 to provide a resilient bearing support for the shaft 32 and also to prevent escape of air from the chamber 29 between the shaft 32 and boss 35. The arm 31 is rotatably supported relative to the sleeve 36' by annular bearing members 36'' such that rotation of shaft 32 is completely independent of rotation of arm 31 except for a resilient spring interconnection to be described below.

The shaft 32 has a splined portion 37 at one end and another splined portion 37' at an opposite end. A lever arm 38 best seen in the view of Fig. 3 is attached to the splined portion 37 at one end so that the lever arm 38 is oscillated by rotation of the shaft 32. A torsion spring 40 surrounds a centrally split spacing means 41 provided on the sleeve 36' which extends longitudinally from the boss 35. Opposite ends 43 and 44 of the torsion spring engage opposite lateral edges of the lever arm 38 as shown in Fig. 2. The control arm 31 has a lateral portion 45 that extends parallel to and is located radially inwardly of a longitudinally extending portion 38' of the lever arm 38. Both the portions 38' and 45 of the lever arm 38 and arm 31, respectively, are confined between the ends 43 and 44 of the torsion spring as indicated in Fig. 2. Fig. 3 shows the longitudinal and parallel spacing of the portions 38' and 45 relative to the rotatable shaft 32. Thus when the arm 38 oscillates with the shaft 32, the ends 43 and 44 of the torsion spring tend to carry the control arm 31 through similar and equivalent movement due to engagement of the parts as described.

It is to be understood that the arm 31 is oscillatable by movement of shaft 32 due to movement of arm 20 in response to changes to other than the predetermined clearance height and spacing maintained by the air springs 12 and 13 relative to the axle and chassis described above. The arm 20 is secured to the shaft 32 by the splines 37' as is shown in Fig. 3.

Figure 5:
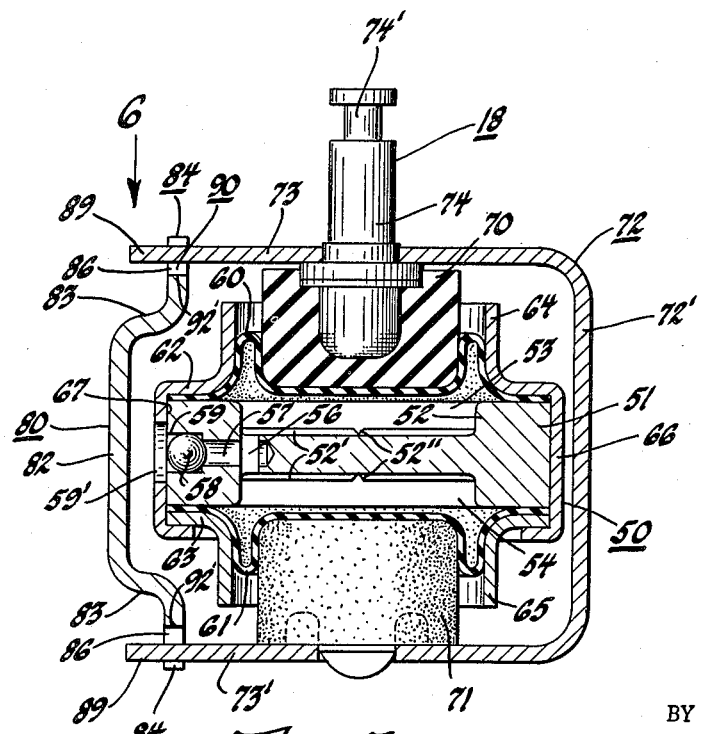
Figure 5 is an enlarged partial cross sectional view of a portion of this control valve mechanism taken along line 4—4 of Fig. 2.
Figure 6:
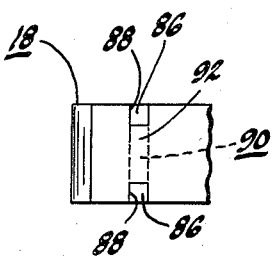
Figure 6 is a fragmentary plan view taken in the direction of arrow 6 in Fig. 5.

Figure 4 also shows an improved structure for assembling the air inlet valve 26 in the valve body 25. A unitary cartridge or sleeve 46 is engaged by threads 47 with the valve body 25 and provides at one end a mounting for the inlet valve 26 and at its opposite end a mounting for a check valve 48. The inlet pipe 28 is suitably connected by threads to the cartridge or sleeve 46 in a conventional manner. The purpose of the check valve 48 is to prevent escape of air under pressure from cavity 29 by way of the inlet pipe whenever the arm 31 actuates the stem 33 of valve 26 but the pressure from reservoir 22 is less than the pressure of air in the cavity 29. In other words, whenever a failure in the air pressure system has occurred such that the pressure of air in the air springs 12 and 13 and in the cavity 29 exceeds the pressure in the reservoir 22, the check valve 48 prevents escape of air under pressure from the cavity 29 and air springs due to opening of the inlet valve 26 for increase of air pressure in the air springs. It is to be noted that the valve body 25 illustrated in Fig. 4 permits access and removal of the valves 26 and 27 without removal of the cover 25'. The cartridge 46 is removable as a unit from the valve body 25 such that the valve 26 can be threaded into engagement with the inner periphery of the cartridge 46 while the cartridge 46 is not in the valve body 25. A cartridge is not necessary for insertion of the valve body 27 because the valve 27 can be easily inserted through the exhaust opening 30 after removal of the fitting 95. Use of the cartridge 47 is advantageous in that the valve 26 can be replaced if necessary without removal or disturbing of the placement of the control arm 31 with the torsion spring 40 and other parts in the cavity 29 to be described in further detail below. The cartridge 46 is readily removable from the body 25 upon detachment of the inlet pipe 28 from one end of the cartridge 46. As shown in Fig. 4, the valves 26 and 48 are screwed inwardly toward the center of the cartridge from each of opposite ends of the cartridge. The cover 25' is removable for access to the torsion spring 40, arm 38, and shaft 32 as well as for access to a detaining or dashpot device generally indicated by numeral 50 in Figs. 2, 4 and 5 of the drawings.

As seen in Fig. 2, the control arm 31 cooperates with the ends 43 and 44 of the torsion spring 40. The torsion spring ends 43 and 44 are maintained in a position dependent upon movement of the arm 20 for oscillation of the shaft 32. The torsion spring 40 in transferring oscillating movement of the arm 38 through ends 43 and 44 of the spring to the arm or actuating plate 31 serves to effect actuation of either the inlet valve 26 or outlet valve 27 in response to a change in clearance height between the axle and chassis of the vehicle. Whenever the clearance height or spacing between the axle and chassis decreases due to an increase of load, for example, it is necessary for the valve 26 to be opened by the actuating plate end 31' through engagement of the stem 33 permitting air under pressure to flow from the reservoir 22 through the inlet pipe 28 causing opening of the check valve 48 and passage of air under pressure to the cavity 29. A fitting 49 attached at an opening 49' communicating with the cavity 29 serves to connect the cavity 29 to the chamber 16 for supplying air under pressure to the air springs 12 and 13 described with Fig. 1. Use of the fitting 49 and a suitable conduit connecting with the chamber 16 is optional and a similar result could be obtained by directly connecting the chamber 29 with the chamber 16 when the valve body 25 is attached to the chassis 10. Similarly, when the clearance height or spacing between the chassis and axle exceeds the predetermined clearance height to be maintained by the suspension system, the arm 20 will be actuated by the link 19 in response to excessive clearance height resulting in a turning of the shaft 32 to transmit force through the arm 38 and torsion spring 40 for opening the exhaust valve 27. When the exhaust valve 27 is open, air under pressure is permitted to escape from the air springs 12 and 13 through chamber 16 by way of the conduit 49 and opening 49', for example, to the cavity 29 to the outlet passage 30 and fitting 95. The spring 40 will transmit no force for actuation of either of the valves 26 and 27 when the shaft 32 is not rotated by the arm 20, that is, when the shaft 32 and arm 20 are not moved in response to a change in clearance height because the air suspension system is maintaining the exact predetermined clearance height desired between the chassis and axle of the vehicle. Thus the arm 31 is pivoted about the axis of the shaft 32 for actuation of the inlet valve 26 and outlet valve 27 whenever the axle and chassis are spaced relative to each other at other than the predetermined clearance to be maintained by the suspension system. The control arm 31 is returned to a neutral position relative to actuation of the valves 26 and 27 due to supply or exhaust of air relative to the air springs for returning to and reestablishing of the predetermined clearance height between the axle and chassis. Whenever predetermined clearance height is maintained between the axle and chassis, the link 19 serves to keep the arm 20 at a position shown in the drawings such that the torsion spring 40 remains in a neutral centering position wherein the actuating plate or arm 31 is in a neutral position shown in Figs. 2 and 4 where neither the inlet valve 26 or outlet valve 27 is actuated.

The movement of the actuating plate or arm 31 away from a neutral position is further controlled by the dashpot or damping means 50. The dashpot includes an annular body or partition 51 shown most clearly in Fig. 5. The body 51 has a transverse wall 52 forming open-ended spaces or cavities on opposite sides. These cavities 53 and 54 communicate with each other by means of a port or restrictive passage 56 extending through the transverse wall 52. A passage 57 for filling the cavities 53 and 54 with damping and temperature-sensitive fluid is provided extending laterally of the restrictive passage 56. A ball or sealing member 58 press fitted into a recess 59 closes off the filling passage 57 whenever a predetermined amount of liquid has been filled into the cavities 53 and 54.

The cavities 53 and 54 are closed at their open ends by flexible diaphragms 60 and 61 which are formed of a rubber-like or flexible plastic material. The diaphragms are retained against opposite peripheral surfaces of the body 51 by radial flanges 62 and 63 of sleeves 64 and 65. An annular extension 66 from flange 62 of sleeve 64 extends around body 51 and has a turned over end relative to flange 63 of sleeve 65 for retaining the body 51 and diaphragms 60—61 in tightly sealed relationship causing cavities 53 and 54 to be formed into compartments. An opening 59' is formed at one side of the annular sleeve extension 66 to permit removal of the sealing member 58 for filling of the compartments 53 and 54 through passage 57 and restrictive port 56. The inner wall surface 67 of the annular sleeve portion 66 is a true cylindrical surface coaxial with the axis of the annular body 51. The diaphragms 60 and 61 are maintained in sealing relationship with the opposite surfaces of the body 51 by the radial flanges 62 and 63 of the sleeves 64 and 65.

Each diaphragm 60 and 61 is engaged by cylindrical plugs 70 and 71, respectively, which maintain the diaphragms in a predetermined spaced relationship relative to the partition 52 of the body 51. The plugs or cylindrical buttons 70 and 71 engage central areas of the diaphragms 60 and 61 and are resiliently urged and pressed into engagement with the diaphragms by a U-shaped spring means generally indicated by the numeral 72. The U-shaped spring is provided with a transverse portion 72' connecting oppositely extending legs 73 and 73'. A shaft 74 is rigidly attached to the leg 73 and the button or plug 70 at one end and is attached at its other end by a head portion 74' to the central portion 31'' of the arm or plate 31 that actuates the valves 26 and 27. The portion 72' and leg 73' of the U-shaped spring means 72 effects resilient urging and pressing of the button or plug 71 into engagement with the diaphragm 61 complementary to the urging and pressing action of button or plug 70 on diaphragm 60 the opposite side of the body 51. Due to the resilience of the spring means 72, the button 71 is always urged toward the button 70 and results in positive engagement of diaphragm 60 by button 70 and diaphragm 61 by button 71 such that fluid filled into the compartments 53 and 54 is positively engaged by the diaphragms 60 and 61 in response to expansion and contraction of the fluid due to variation in temperature of the air in the cavity 29 which can result in a change of the volume of fluid within compartments 53 and 54. Displacement of fluid between compartment 53 and compartment 54 by way of the restricting passage 56 results in a resistance or damping force opposing pivotal movement of the arm 31 about the axis of the shaft 32 as is resiliently effected by the cooperating ends 43 and 44 of the torsion spring 40 relative to the arm 38 on shaft 32 as described above. The opposite surfaces of the partition 52 of body 51 are provided with undercuts or grooves 52' and 52'' so that the diaphragms 60 and 61 are always exposed to some fluid remaining in each of the compartments 53 and 54 when the arm 31 travels in an actuating movement resulting in displacement of nearly all of the fluid from one compartment to the other in the dashpot means 50. Thus the restricting port 56 is always in communication with the recess or undercut 52' or 52'' extending radially over the opposite surfaces of the partition 52 in the body 51. As a result, diaphragm 60, for example, when it is depressed downwardly by the button 70 to engage the top surface of the partition 52 can be urged upwardly by fluid in the undercuts 52' and 52'' when arm 31 and spring means 72 move to shift the position of the buttons engaging the diaphragms, in response to supply of air under pressure (or exhaust of air under pressure) relative to the air springs 12 and 13 for reestablishment of predetermined clearance height between the chassis 10 and axle 11 in the operation of the air suspension system embodying the present invention.

It is to be understood that the compartments 53 and 54 are filled with a suitable fluid providing both a temperature compensating function by being responsive for expansion and contraction with temperature changes, and also to serve in the damping operation as described above. The fluid may be of a silicone-type liquid having a fairly constant viscosity so as to assure substantially equivalent rates of damping regardless of the temperature of the air surrounding the dashpot. However, the volume of the fluid should be variable in proportion to changes of temperature surrounding the dashpot. It may be advisable to coat a covering of Mylar or other suitable sealing means over the inner surfaces of the diaphragms 60 and 61 so as to prevent leakage of the damping and thermal compensating fluid and also to prevent air or other gases from seeping through the diaphragm causing contamination of the fluid of the chambers 53 and 54.

The U-shaped spring means 72 described earlier resiliently urges the buttons 70 and 71 into engagement with the diaphragms 60 and 61, respectively, thereby causing the diaphragms to be seated by the buttons in engagement with the fluid inside the chambers 53 and 54. If the fluid in the chambers contracts due to a lower environmental temperature, the resilient spring means 72 will urge the buttons 70 and 71 to move toward each other causing a further following of the diaphragms against the fluid within the compartments 53 and 54. Even when this contraction occurs due to the contraction of the fluid, the damping operation can occur for delaying the movement of the actuating plate or arm 31 as described above. However, there is a danger that with wide ranges of temperature variations where air suspension equipped automobiles may be driven on hot deserts or in cold arctic climates, that the fluid in the dashpot chambers 53 and 54 may contract more than is desired, especially in cold climates. In such instances, it is necessary that a safety means be provided for preventing complete collapse of the diaphragms relative to the fluid in the compartments 53 and 54. This complete collapse could result in movement of buttons 70 and 71 to a position closely adjacent the partition 52 on each of opposite sides thereof due to the inherent force of the spring means 72. Whenever the spring means 72 urges the buttons 70 and 71 so close to the partition 52, the shaft 74 can transmit a movement to the arm 31 which could effect free exhausting of air through valve 27 shown in Fig. 4. Since free exhaust through the valve 27 would permit the air under pressure in the air springs 12 and 13 of the system of Fig. 1 to escape, the system would fail in its function of maintaining a predetermined clearance height between sprung and unsprung masses of a vehicle.

To assure maintenance of a predetermined minimum separation of the spring-urged buttons 70 and 71 during thermal compensating functioning whereby temperature compensation is prevented from causing free exhaust of air from the air springs 12 and 13, a safety spacing means or bracket is provided with the dashpot of the present invention. This safety spacing means generally indicated by the numeral 80 is clearly visible in Figs. 4 and 5. The spacing means includes a body portion 82 extending in opposite directions to flange portions 83 each of which is substantially transverse to the body portion and terminates in dove-tailing end portions generally indicated by numeral 84. The end portions each have a pair of outwardly extending legs 86 which engage lateral slots 88 formed adjacent each end 89 of the U-shaped spring means. The legs 86 are provided with the spacing means 80 extending from the ends thereof on opposite sides of a cutout or slot portion generally indicated by the numeral 90. A bridge portion 92 of the U-shaped spring means 72 is normally movable within the space provided by the slot portion 90 at each of opposite ends of the spacing means 80. However, when the contraction of fluid within the compartments 53 and 54 becomes excessive, and could result in a collapse of the diaphragms relative to the partition 52, the movement of the ends 89 of the U-shaped spring means 72 is restricted due to engagement of the bridge portion 92 adjacent each spring end relative to an abutment or shoulder means 92' at each of opposite ends of the bracket or spacing means 80. This abutment or stop means is formed at the bottom portion of the slot 90. Since the ends 89 of the U-shaped spring means 72 are prevented from moving more than a predetermined distance toward each other, the dashpot of the present invention serving both damping and thermal compensating functions is prevented from causing a full exhaust of air to occur from the air springs by way of the exhaust valve 27.

It is to be understood that the valves 26 and 27 described with Fig. 4 are a conventional tire type valve in which each of the stems 33 and 34 are biased by internal spring means within the valves 26 and 27 to a normally closed position of these valves. In Fig. 4 there is a phantom representation of conical springs 93 and 94 provided with the valves 26 and 27. The base of each spring is seated against a shoulder inside a body of each valve 26 and 27. The apex of each of these springs indicated by the numerals 93' and 94', respectively, is preferably press-fitted or attached to each of the stems 33 and 34, respectively. Thus a valve member 96 of inlet valve 26 and a valve member 97 of exhaust valve 27 are each normally biased to a closed position. The forces of the springs 93 and 94 are necessarily in opposition to each other. Thus the force of spring 93 is exerted downwardly through stem 33 relative to the arm 31 while the force of spring 94 is exerted upwardly through the stem 34 relative to the arm or plate 31. The resultant force of the springs is zero when the actuating plate or arm 31 is in a neutral position because then each of the members 96 and 97 is positioned relative to its seat provided with a body of each of the valves 26 and 27. However, when either the inlet or exhaust valve is operated, either spring 93 or spring 94 will exert force relative to the actuating plate or arm 31 urging the plate to return to its neutral positioning where neither the inlet or exhaust valve is open. Thus a self-centering action occurs due to the springs 93 and 94. This self-centering force due to the springs 93 and 94 is effective upon the arm 31 in addition to the force of torsion spring 40 described with Figs. 2 and 3.

It is apparent that the valve mechanism of the present invention provides a plate or arm 31 for actuation of inlet and exhaust valves subject to force of springs 40, 93, and 94 during valve operation as affected by a dashpot having both thermal compensating and damping functions. The damping action of the dashpot provides sensitivity in the actuation of the valves 26 and 27 by preventing actuation of the valves due to vibratory forces which may be conveyed through the actuating arm 20 between the axle and chassis. However, for changes in clearance height due to change of position of the chassis relative to the axle by change of loading, for example, the torsion spring 40 as well as the springs 93 and 94 influence the movement of the arm 31. Also the temperature compensating function of the fluid inside the dashpot due to urging of the buttons 70 and 71 with the diaphragms 60 and 61 inwardly toward the partition 52 by the force of the spring means 72 further influences the operation of the inlet and exhaust valves 26 and 27. It is apparent that the safety means 80 safeguard against a complete collapse of the buttons and diaphragms relative to the compartments 53 and 54 under urging of the spring means 72. The legs 89 of the U-shaped spring means 72 are restricted from moving beyond a predetermined distance toward each other by the abutments 92' formed with the bracket or spacing means 80 as described above.

While the embodiments of the present invention as herein disclosed constitutes a preferred form, it is to be understood that other forms might be adopted.

What is claimed is as follows:

1. Apparatus for controlling a suspension system of a vehicle having a sprung mass supported on an unsprung mass by a resilient fluid spring, comprising, valve means for controlling supply and exhaust of pressure fluid to and from an air spring, a control arm engageable with said valve means to actuate the same in response to movement of the sprung mass relative to the unsprung mass to effect said supply or exhaust of pressure fluid, movement damping means having chamber means filled with a fluid medium and having a movable wall collapsible into said chamber means on reduction of volume of fluid in the chamber resulting from either contraction under low ambient temperature condition or from loss of fluid, means connecting said movable wall to said control arm normally to damp movement thereof, and movement limiting means engageable by said wall on volume reduction of said fluid to prevent said wall moving said control arm to an extent sufficient to actuate said valve means.

2. Apparatus for controlling a suspension system of a vehicle having a sprung mass supported on an unsprung mass by a resilient fluid spring, comprising, valve means for controlling supply and exhaust of pressure fluid to and from a fluid spring, a control arm actuated in response to movement between the sprung mass and the unsprung mass representing a change in clearance height between the sprung mass and unsprung mass and engaging said valve means to actuate the same for effecting supply or exhaust of fluid to and from the fluid spring, a damping device having a pair of compartments interconnected by restrictive passage means through which fluid filling the compartments is displaced between said compartments, each of said compartments having one closing wall formed by a flexible diaphragm, said diaphragms being supported solely by the fluid in said compartments in the compartment area covered by the respective diaphragms and thereby collapsible into the respective compartments on reduction of fluid volume in the compartments for any reason, movable members engaging the outer sides of the flexible diaphragms for said compartments, spring means extending between said movable members urging the same toward one another to place the fluid in said compartments under compressive pressure and retain thereby said diaphragms in surface engagement with the fluid in said compartments on fluid volume variation caused by changes in ambient temperature, means connecting said spring means with said control arm normally to damp movement of said arm, and a spacing means for said spring means normally ineffective but effective to limit minimum spacing of said movable members relative to one another on volume contraction of the fluid damping medium for any reason to prevent said damping device effecting thereby sufficient movement of said control arm to actuate said valve means.

3. Apparatus for controlling a suspension system of a vehicle having a sprung mass supported on an unsprung mass by a resilient fluid spring, comprising, valve means for controlling supply and exhaust of pressure fluid to and from a fluid spring, a control arm actuated in response to movement between the sprung mass and the unsprung mass representing a change in clearance height between the sprung mass and unsprung mass and engaging said valve means to actuate the same for effecting supply or exhaust of fluid to and from the fluid spring, a damping device having a pair of compartments interconnected by restrictive passage means through which fluid filling the compartments is displaced between said compartments, each of said compartments having one closing wall formed by a flexible diaphragm, said diaphragms being supported solely by the fluid in said compartments in the compartment area covered by the respective diaphragms and thereby collapsible into the respective compartments on reduction of fluid volume in the compartments for any reason, movable members engaging the outer sides of the flexible diaphragms for said compartments, U-shaped spring means extending between said movable members with one of the legs of the U-shaped spring member engaging respectively one of the said movable members and urging the said movable members toward one another to place the fluid in said compartments under compressive pressure and retain thereby said diaphragms in surface engagement with the fluid in said compartments on fluid volume variation caused by changes in ambient temperature, means connecting one of the legs of said U-shaped spring means with said control arm normally to damp movement of said arm, and a spacing strut member positioned in the open end of said U-shaped spring member between the said legs thereof to limit minimum spacing of said movable members relative to one another on volume contraction of the fluid damping medium for any reason to prevent said spring leg connected with said control arm effecting thereby sufficient movement of said control arm to actuate said valve means as a result of the volume contraction of the fluid damping medium in said damping device.

4. In a control device for governing supply and exhaust of fluid in a suspension system of a vehicle having a sprung mass supported on an unsprung mass by a resilient fluid spring, a movement damping device filled with a fluid medium having thermal expansion and contraction characteristics, comprising, means forming a pair of adjacent chambers filled with the fluid medium and forming a restrictive passage for displacement of fluid between the chambers, flexible diaphragm means closing each of the chambers, a movable cylindrical member engaging each of said diaphragm means, means interconnecting said members producing a resilient force placing said fluid medium in said chambers under compression by said members through said diaphragm means, and spacing means connected with said members to limit their movement toward one another and normally ineffective but effective upon a predetermined volume reduction of the fluid medium to prevent movement of said members beyond a predetermined extent upon contraction of the fluid medium in the chambers and prevent thereby said damping device operating the control device because of volume reduction of the fluid in the damping device.

5. In a control device for governing supply and exhaust of air in a suspension system of a vehicle having a sprung mass supported on an unsprung mass by an air spring, a movement damping device filled with a fluid medium having thermal expansion and contraction characteristics, comprising, means forming a pair of adjacent spaces filled with the fluid medium and forming a resistance passage for displacement of fluid medium between the spaces, a flexible diaphragm closing each of the spaces and supported solely by the fluid medium therein, means engaging said diaphragms applying pressure thereto normally maintaining the fluid medium in the spaces under pressure irrespective of expansion and contraction of the fluid medium due to temperature change, and spacing means normally ineffective but rendered effective for limiting movement of said means engaging said diaphragms beyond a predetermined extent upon volume reduction of the fluid medium to prevent collapse of the diaphragms which would result in operation of the control device.

6. In a control device for governing the supply and exhaust of air in a suspension system of a vehicle having a sprung mass supported on an unsprung mass by an air spring, a dashpot means filled with a fluid medium having a volume variable in response to changes of temperature and used in damping regulation of the control device, comprising, means forming a pair of adjacent compartments filled with the fluid medium and forming a resistance passage for displacement of fluid between the compartments, flexible diaphragm means closing each of the compartments and supported solely upon the fluid in the compartments, a substantially U shaped spring means operably effective on the said diaphragms maintaining the fluid medium in the compartments normally in engagement with said diaphragm means irrespective of contraction and expansion of the fluid medium to maintain uniformity in operation of said dashpot means in damping regulation of the control device, and a rigid spacing member between free ends of said U-shaped spring means normally ineffective to space the said ends but effective upon volume reduction of the fluid in said dashpot means for limiting movement of said spring means beyond a predetermined extent toward collapse of said diaphragm means upon contraction of fluid medium in said dashpot means.

7. In a control device for governing the supply and exhaust of air in a suspension system of a vehicle having a sprung mass supported on an unsprung mass by an air spring, a dashpot means filled with a fluid medium having a volume variable in response to changes of temperature and used in damping regulation of the control device, comprising, means forming a pair of adjacent compartments filled with the fluid medium and forming a resistance passage for displacement of fluid between the compartments, flexible diaphragm means closing each of the compartments and supported solely upon the fluid in the compartments, a substantially U-shaped spring means operably effective on the said diaphragms maintaining the fluid medium in the compartments normally in engagement with said diaphragm means irrespective of contraction and expansion of the fluid medium to maintain uniformity in operation of said dashpot means in damping regulation of the control device, and a rigid spacing member having an effective length less than the spacing distance between the free ends of the U-shaped spring and being engageable by the said free ends to limit movement of the free ends toward one another and thereby prevent said dashpot means operating said control device upon volume reduction in the said chambers of the dashpot means.

References Cited in the file of this patent

UNITED STATES PATENTS

| | | |
|---|---|---|
| 2,112,059 | Arthur | Mar. 22, 1938 |
| 2,317,028 | Chappell et al. | Apr. 20, 1943 |
| 2,361,575 | Thompson | Oct. 31, 1944 |
| 2,529,883 | Otto | Nov. 14, 1950 |
| 2,579,334 | Plank | Dec. 18, 1951 |
| 2,670,201 | Rossman | Feb. 23, 1954 |